(12) United States Patent
Wadley et al.

(10) Patent No.: US 10,412,082 B2
(45) Date of Patent: Sep. 10, 2019

(54) MULTI-VARIABLE COMPOSITION AT CHANNEL FOR MULTI-FACETED AUTHENTICATION

(71) Applicant: BANK OF AMERICA CORPORATION, Charlotte, NC (US)

(72) Inventors: Cameron Darnell Wadley, Waxhaw, NC (US); William August Stahlhut, The Colony, TX (US); Elizabeth S. Votaw, Potomac, MD (US); Jeffery B. Schroeder, Indian Trail, NC (US)

(73) Assignee: BANK OF AMERICA CORPORATION, Charlotte, NC (US)

( * ) Notice: Subject to any disclaimer, the term of this patent is extended or adjusted under 35 U.S.C. 154(b) by 204 days.

(21) Appl. No.: 15/454,973

(22) Filed: Mar. 9, 2017

(65) Prior Publication Data
US 2018/0262489 A1 Sep. 13, 2018

(51) Int. Cl.
*G06F 21/00* (2013.01)
*H04L 29/06* (2006.01)
(Continued)

(52) U.S. Cl.
CPC ........ *H04L 63/0861* (2013.01); *H04L 9/0852* (2013.01); *H04L 63/083* (2013.01);
(Continued)

(58) Field of Classification Search
None
See application file for complete search history.

(56) References Cited

U.S. PATENT DOCUMENTS 7,135,701 B2 11/2006 Amin et al.
7,418,283 B2 8/2008 Amin
(Continued)

FOREIGN PATENT DOCUMENTS

| AU | 2010249233 A1 | 6/2011 |
| CA | 2886849 A1 | 10/2016 |

(Continued)

OTHER PUBLICATIONS

S. Liu and M. Silverman, "A practical guide to biometric security technology," in IT Professional, vol. 3, No. 1, pp. 27-32, Jan.-Feb. 2001. (Year: 2001).*

*Primary Examiner* — Alexander Lagor
(74) *Attorney, Agent, or Firm* — Michael A. Springs; Moore & Van Allen PLLC; Nicholas C. Russell (57) ABSTRACT

Embodiments of the present invention provide a system for providing real-time multi-faceted authentication of a user before or during the user's interaction with a channel. The system uses authentication devices to acquire large amounts of authentication level information data, then makes a determination that at least a portion of the acquired authentication level information data cannot be efficiently processed by a conventional computer apparatus due to the complexity of a required analysis process and/or the quantity of data that must be processed. The system then formats and transmits this authentication data to a special quantum optimizer that is configured to perform the complex analysis and/or process extremely large volumes of data substantially in real-time. The quantum optimizer performs the analysis and returns a confirmed identity of the user that is then used by the conventional computer apparatus to authenticate the user for the interaction with the channel.

20 Claims, 4 Drawing Sheets

(51) Int. Cl.
   *H04L 9/08* (2006.01)
   *G06Q 20/10* (2012.01)
   *G06Q 20/40* (2012.01)

(52) U.S. Cl.
   CPC ..... *G06Q 20/1085* (2013.01); *G06Q 20/4014* (2013.01); *H04L 2463/082* (2013.01)

(56) References Cited

U.S. PATENT DOCUMENTS

| | | | |
|---|---|---|---|
| 7,533,068 B2 | 5/2009 | Maassen van den Brink et al. | |
| 7,619,437 B2 | 11/2009 | Thom et al. | |
| 7,639,035 B2 | 12/2009 | Berkley | |
| 7,898,282 B2 | 3/2011 | Harris et al. | |
| 8,008,942 B2 | 8/2011 | van den Brink et al. | |
| 8,190,548 B2 | 5/2012 | Choi | |
| 8,195,596 B2 | 6/2012 | Rose et al. | |
| 8,283,943 B2 | 10/2012 | van den Brink et al. | |
| 8,421,053 B2 | 4/2013 | Bunyk et al. | |
| 8,744,075 B2 | 6/2014 | Tanaka | |
| 8,897,449 B1 | 11/2014 | Broadbent | |
| 9,207,672 B2 | 12/2015 | Williams et al. | |
| 9,246,675 B2 | 1/2016 | Ding | |
| 9,400,499 B2 | 7/2016 | Williams et al. | |
| 9,537,660 B2 | 1/2017 | Wang et al. | |
| 2003/0209599 A1* | 11/2003 | Gatto | G06Q 20/10 235/379 |
| 2004/0139000 A1 | 7/2004 | Amos | |
| 2005/0010508 A1 | 1/2005 | Groz | |
| 2006/0078172 A1* | 4/2006 | Zhang | G06K 9/00268 382/118 |
| 2006/0088157 A1 | 4/2006 | Fujii | |
| 2006/0159312 A1* | 7/2006 | Chiang | G06K 9/00221 382/115 |
| 2006/0251247 A1 | 11/2006 | Akiyama et al. | |
| 2008/0260257 A1* | 10/2008 | Rose | B82Y 10/00 382/195 |
| 2012/0002008 A1 | 1/2012 | Valin et al. | |
| 2013/0117200 A1 | 5/2013 | Thom | |

FOREIGN PATENT DOCUMENTS

| | | |
|---|---|---|
| CN | 101834724 A | 9/2010 |
| CN | 101867474 A | 10/2010 |
| CN | 102025491 A | 4/2011 |
| CN | 102664732 A | 9/2012 |
| CN | 103200000 A | 7/2013 |
| CN | 103200001 A | 7/2013 |
| CN | 103312498 A | 9/2013 |
| CN | 103338448 A | 10/2013 |
| CN | 104504601 A | 4/2015 |
| EP | 2462717 A1 | 6/2012 |
| KR | 100563907 B1 | 3/2006 |
| WO | 2010105993 A2 | 9/2010 |
| WO | 2015149035 A1 | 10/2015 |

* cited by examiner

MULTI-VARIABLE COMPOSITION AT CHANNEL FOR MULTI-FACETED AUTHENTICATION

FIELD

In general, embodiments of the invention relate to identifying and authorizing a user entering a channel in real-time through the use of quantum computing, and more particularly, methods, devices, and computer program products for implementing an identification and authentication system that leverages the optimization advantages of a quantum device.

BACKGROUND

The field of quantum computing is rapidly developing in a way that has made commercial implementations of quantum computers not only feasible, but practical. Quantum computing is opening doors to the possibility of real-time analysis on data and information that would take impracticably long by conventional technologies.

For entities that have a need to authenticate an identity of a user in real-time, the emergence of quantum computing technology has important implications for both security and convenience. Existing methods for authenticating a user are forced to find a trade-off balance between speed and accuracy. It is an object of the present invention to leverage the capabilities of quantum computing in a multi-variable composition approach to authenticating a user entering a channel in real-time, thereby eliminating the need to choose between speed and accuracy.

BRIEF SUMMARY OF THE INVENTION

The following presents a simplified summary of one or more embodiments in order to provide a basic understanding of such embodiments. This summary is not an extensive overview of all embodiments, and it is intended to neither identify key or critical elements of all embodiments, nor delineate the scope of any or all embodiments. The summary's sole purpose is to present some concepts of one or more embodiments in a simplified form as a prelude to the more detailed description that is presented later.

Embodiments of the present invention address the above needs and/or achieve other advantages by providing apparatuses (e.g., a system, computer program product and/or other devices) and methods for providing real-time multi-faceted authentication of a user at a channel. The system embodiments may comprise a classical computer apparatus with a processor, a memory, and a user authentication processing application that is stored in the memory and executable by the processor. Furthermore, the system embodiments may comprise a quantum optimizer in operative communication with the classical computer apparatus, where the quantum optimizer comprises a quantum processor and a quantum memory. In computer program product embodiments of the invention, the computer program product comprises at least one non-transitory computer readable medium comprising computer readable instructions for carrying out the invention. Computer implemented method embodiments of the invention may comprise providing a computing system comprising a computer processing device and a non-transitory computer readable medium, where the computer readable medium comprises configured computer program instruction code, such that when said instruction code is operated by said computer processing device, said computer processing device performs certain operations to carry out the invention.

For sample, illustrative purposes, system environments will be summarized. The authentication processing application of the system may be configured to receive a notification from one or more detection devices that a user has entered a channel and, in response to receiving the notification from the one or more detection devices, automatically transmit a request to one or more authentication devices to initiate authentication of the user in real-time. The system may also be configured to receive, from the one or more authentication devices, authentication level information associated with the user and determine that the authentication level information associated with the user received from at least one of the one or more authentication devices is suitable for quantum optimization. Furthermore, the system may format the authentication level information associated with the user that is suitable for quantum optimization and, in response to formatting the authentication level information, automatically transmit the formatted authentication level information associated with the user to the quantum optimizer. The system may then receive, from the quantum optimizer, a notification of a confirmed identity of the user and receive, from the one or more authentication devices, a presented identity of the user. Finally, the system can compare the received confirmed identity of the user with the received presented identity of the user to determine a match, and authenticate the user in response to determining the match. In some such embodiments, the quantum optimizer of the system is configured to receive the formatted authentication level information associated with the user from the classical computer apparatus, analyze the formatted authentication level information associated with the user to determine the confirmed identity of the user, and transmit the confirmed identity of the user to the classical computer apparatus.

In some embodiments, the system, in response to authenticating the user, present the user with a personalized display at the channel.

Additionally, the system may be further configured such that determining that the authentication level information is suitable for quantum optimization further comprises a determination that processing the authentication level information by the classical computer apparatus alone is not feasible.

The one or more authentication devices of the system may comprise at least one of a three-dimensional camera, a pressure plate, a microphone, and a radio frequency identification chip. In some such embodiments, where the one or more authentication devices comprises a three-dimensional camera, the authentication level information may comprise at least a three-dimensional facial recognition map of the user.

The presented user identity of the system may comprise a personal identification number (PIN), wherein verification of the user further comprises confirming that the presented user identity matches a known PIN for that user.

In some embodiments of the system, the channel comprises one of an automated teller machine (ATM), a financial institution banking center, or a computer terminal connected over Internet to financial institution servers.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Having thus described embodiments of the invention in general terms, reference will now be made the accompanying drawings, wherein:

DETAILED DESCRIPTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to elements throughout. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Although some embodiments of the invention herein are generally described as involving a "financial institution," one of ordinary skill in the art will appreciate that other embodiments of the invention may involve other businesses that take the place of or work in conjunction with the financial institution to perform one or more of the processes or steps described herein as being performed by a financial institution. Still in other embodiments of the invention the financial institution described may be replaced with other types of businesses that offer payment account systems to users.

As may be appreciated by one of skill in the art, the present invention may be embodied as a method, system, computer program product, or a combination of the foregoing. Accordingly, the present invention may take the form of an entirely software embodiment (including firmware, resident software, micro-code, and the like) or an embodiment combining software and hardware aspects that may generally be referred to herein as a "system." Furthermore, certain aspects of embodiments of the present invention may take the form of a computer program product on a computer-readable medium having computer-usable program code embodied in the medium.

Any suitable computer-readable medium may be utilized. The computer-readable medium may be, for example but not limited to, an electronic, magnetic, optical, electromagnetic, or semiconductor system, apparatus, or device. More specific examples of the computer readable medium include, but are not limited to, the following: a tangible storage medium such as a portable computer diskette, a hard disk, a random access memory (RAM), a read-only memory (ROM), an erasable programmable read-only memory (EPROM or Flash memory), a compact disc read-only memory (CD-ROM), or other optical or magnetic storage device.

Computer program code for carrying out certain operations of embodiments of the present invention may be written in an object oriented, scripted or unscripted programming language such as Java, Perl, Smalltalk, C++, SAS or the like. However, the computer program code for carrying out operations of embodiments of the present invention may also be written in conventional procedural programming language, such as the "C" programming language or similar programming language.

Embodiments of the present invention provide a system for providing real-time multi-faceted authentication of a user before or during the user's interaction with a channel. The system uses authentication devices to acquire large amounts of authentication level information data, then makes a determination that at least a portion of the acquired authentication level information data cannot be efficiently processed by a conventional computer apparatus due to the complexity of a required analysis process and/or the quantity of data that must be processed. The system then formats and transmits this authentication data to a special quantum optimizer that is configured to perform the complex analysis and/or process extremely large volumes of data substantially in real-time. The quantum optimizer performs the analysis and returns a confirmed identity of the user that is then used by the conventional computer apparatus to authenticate the user for the interaction with the channel.

In general, the present invention is directed to systems, methods, and computer programs for multi-variable composition at a channel for multi-faceted authentication. The present invention enables a financial institution, or any other managing entity, to authenticate a user in real-time as they enter a channel. Authenticating a user in real-time as they enter a channel is desirable for other reasons. For one thing, real-time authentication provides an enhanced layer of security that prevents unauthorized transactions. Moreover, the system may be able to personalize certain aspects of the channel to the user's preferences, thereby enhancing the user experience. To accomplish these goals, embodiments of the present invention leverage the capabilities of quantum computing to identify and authenticate users entering a channel in real-time or near real-time.

As used herein, a quantum computer is any computer that utilizes the principles of quantum physics to perform computational operations. Several variations of quantum computer design are known, including photonic quantum computing, superconducting quantum computing, nuclear magnetic resonance quantum computing, and/or ion-trap quantum computing. Regardless of the particular type of quantum computer implementation, all quantum computers encode data onto qubits. Whereas classical computers encode bits into ones and zeros, quantum computers encode data by placing a qubit into one of two identifiable quantum states. Unlike conventional bits, however, qubits exhibit quantum behavior, allowing the quantum computer to process a vast number of calculations simultaneously.

A qubit can be formed by any two-state quantum mechanical system. For example, in some embodiments, a qubit may be the polarization of a single photon or the spin of an electron. Qubits are subject to quantum phenomena that cause them to behave much differently than classical bits. Quantum phenomena include superposition, entanglement, tunneling, superconductivity, and the like.

Two quantum phenomena are especially important to the behavior of qubits in a quantum computer: superposition and entanglement. Superposition refers to the ability of a quantum particle to be in multiple states at the same time. Entanglement refers to the correlation between two quantum particles that forces the particles to behave in the same way even if they are separated by great distances. Together, these two principles allow a quantum computer to process a vast number of calculations simultaneously.

In a quantum computer with n qubits, the quantum computer can be in a superposition of up to 2 n states simultaneously. By comparison, a classical computer can only be in one of the 2 n states at a single time. As such, a quantum computer can perform vastly more calculations in a given time period than its classical counterpart. For example, a quantum computer with two qubits can store the information of four classical bits. This is because the two qubits will be a superposition of all four possible combinations of two classical bits (00, 01, 10, or 11). Similarly, a three qubit system can store the information of eight classical bits, four qubits can store the information of sixteen classical bits, and so on. A quantum computer with three hundred qubits could possess the processing power equivalent to the number of atoms in the known universe.

Despite the seemingly limitless possibilities of quantum computers, present quantum computers are not yet substitutes for general purpose computers. Instead, quantum computers can outperform classical computers in a specialized set of computational problems. Principally, quantum computers have demonstrated superiority in solving optimization problems. Generally speaking, the term "optimization problem" as used throughout this application describe a problem of finding the best solution from a set of all feasible solutions. In accordance with some embodiments of the present invention, quantum computers as described herein are designed to perform adiabatic quantum computation and/or quantum annealing. Quantum computers designed to perform adiabatic quantum computation and/or quantum annealing are able to solve optimization problems as contemplated herein in real time or near real time.

Embodiments of the present invention make use of quantum ability of optimization by utilizing a quantum computer in conjunction with a classical computer. Such a configuration enables the present invention to take advantage of quantum speedup in solving optimization problems, while avoiding the drawbacks and difficulty of implementing quantum computing to perform non-optimization calculations. Examples of quantum computers that can be used to solve optimization problems parallel to a classic system are described in, for example, U.S. Pat. Nos. 9,400,499, 9,207,672, each of which is incorporated herein by reference in its entirety.

Figure 1:
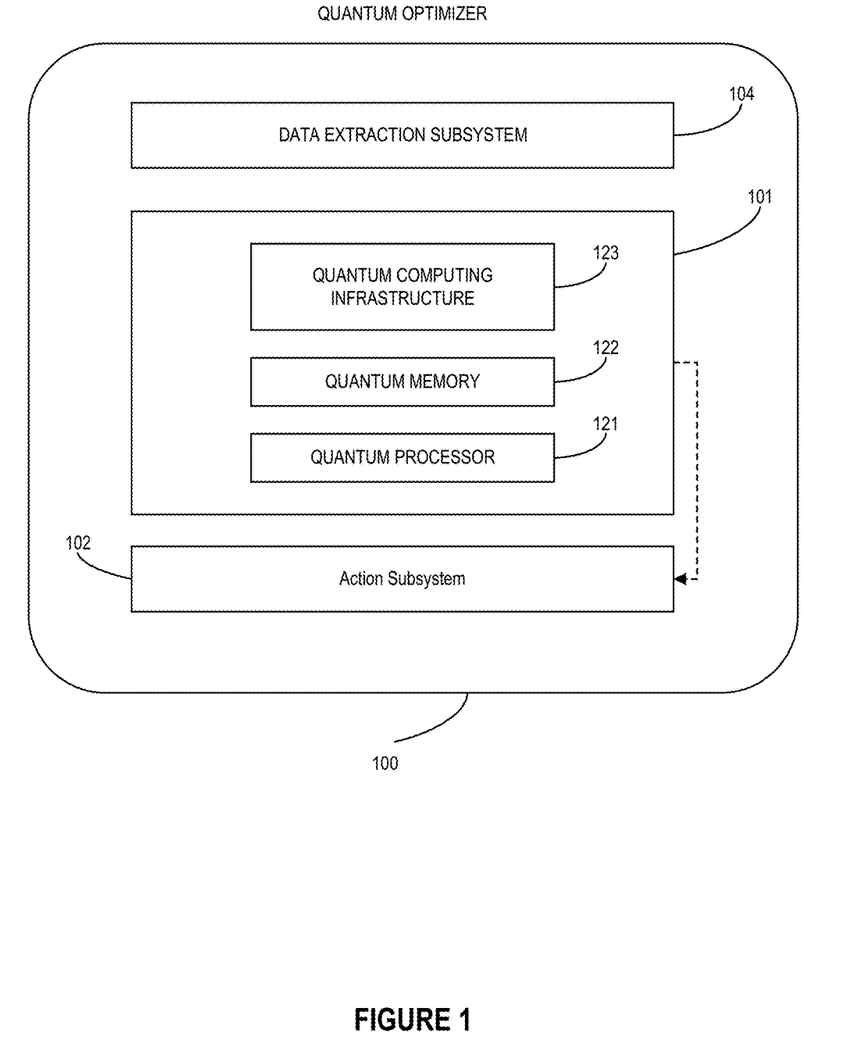
FIG. 1 provides a block diagram illustrating a quantum optimizer, in accordance with an embodiment of the invention.

FIG. 1 is a schematic diagram of an exemplary quantum optimizer 100 that can be used in parallel with a classical computer to solve optimization problems. The quantum optimizer 100 is comprised of a data extraction subsystem 104, a quantum computing subsystem 101, and an action subsystem 105. As used herein, the term "subsystem" generally refers to components, modules, hardware, software, communication links, and the like of particular components of the system. Subsystems as contemplated in embodiments of the present invention are configured to perform tasks within the system as a whole.

As depicted in FIG. 1, the data extraction subsystem 104 communicates with the network to extract data for optimization. It will be understood that any method of communication between the data extraction subsystem 104 and the network is sufficient, including but not limited to wired communication, Radiofrequency (RF) communication, Bluetooth WiFi, and the like. The data extraction subsystem 104 then formats the data for optimization in the quantum computing subsystem.

As further depicted in FIG. 1, the quantum computing subsystem 101 comprises a quantum computing infrastructure 123, a quantum memory 122, and a quantum processor 121. The quantum computing infrastructure 123 comprises physical components for housing the quantum processor 121 and the quantum memory 122. The quantum computing infrastructure 123 may further comprise a cryogenic refrigeration system to keep the quantum computing subsystem 101 at the desired operating temperatures. In general, the quantum processor 121 is designed to perform adiabatic quantum computation and/or quantum annealing to optimize data received from the data extraction subsystem 104. However, any quantum system capable of performing optimization problems may be used. The quantum memory 122 is comprised of a plurality of qubits used for storing data during operation of the quantum computing subsystem 101. In general, qubits are any two-state quantum mechanical system. It will be understood that the quantum memory 122 may be comprised of any such two-state quantum mechanical system, such as the polarization of a single photon, the spin of an electron, and the like.

The action subsystem 102 communicates the optimized data from the quantum computing subsystem 101 over the network. It will be understood that any method of communication between the data extraction subsystem 104 and the network is sufficient, including but not limited to wired communication, Radiofrequency (RF) communication, Bluetooth Wi-Fi, and the like.

Figure 2:
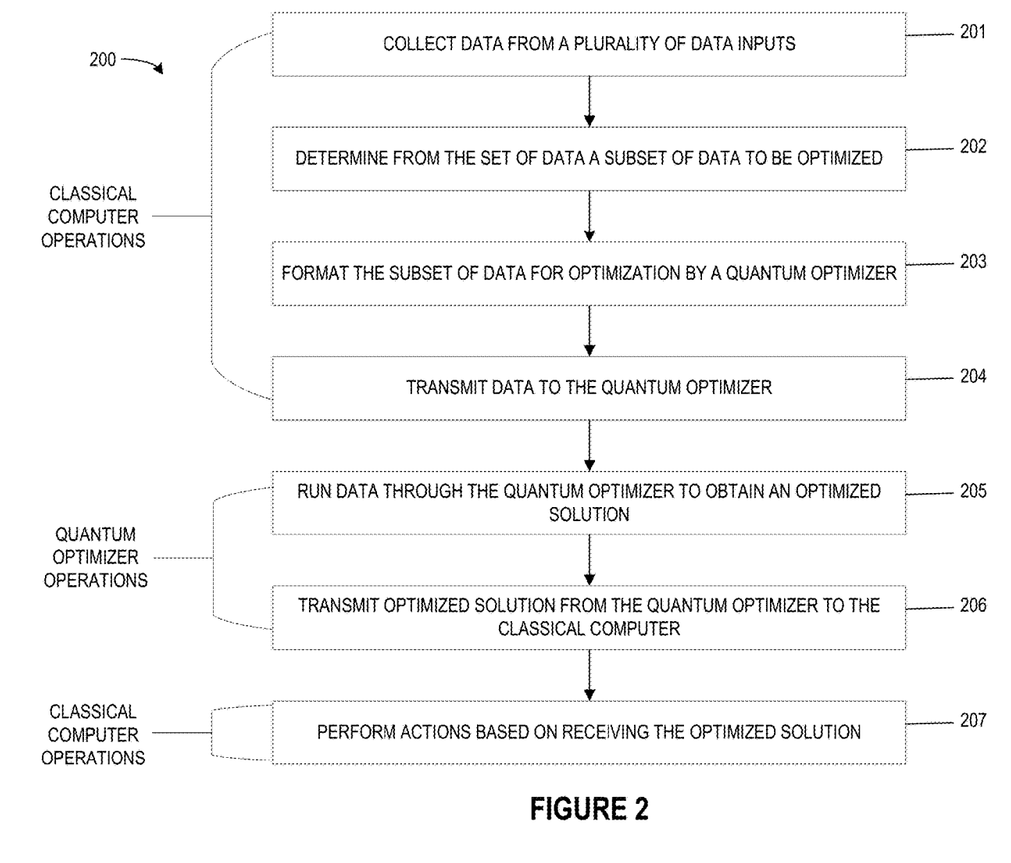
FIG. 2 provides a high level process flow of a system for executing an optimized solution using a quantum optimizer, in accordance with an embodiment of the invention.

FIG. 2 is a high level process flow 200 of an embodiment of the present invention. As depicted in FIG. 2, a classical computer begins the process at step 201 by collecting data from a plurality of inputs. The input(s) may be, for example, a detection device or an authentication device. As used herein, a detection device is any device that recognizes the presence of a user entering a channel. Examples of detection devices may be motion sensors, cameras, heat sensors, pressure plates, microphones, and the like. An authentication device is any device that is used to authenticate a user in the channel. Examples of authentication devices may include three-dimensional cameras, pressure plates, RFID scanners, microphones, and the like. In some embodiments, a detection device may also be an authentication device. In other embodiments, a detection device is separate from an authentication device. Collectively, detection devices and authentication devices may be referred to as channel devices throughout this application.

At step 202, the classical computer of the system then determines from the set of data collected at step 201 a subset a data to be optimized. In some embodiments of the invention, not all data collected at step 201 is necessary for optimization. In an exemplary embodiment, the system may receive data from two authentication devices. The two authentication devices may be a three dimensional camera and a pressure plate. Data from a three-dimensional camera may include facial recognition data, such as a facial topography or a three-dimensional facial recognition map. It should be understood that there may be more than two authentication devices, or only one authentication device, and that the authentication devices are not limited to the aforementioned. The system may determine that data received from the three-dimensional camera needs to be sent to the quantum optimizer, while data from the pressure plate may not. This is because facial recognition data obtained from the three-dimensional camera requires searching extremely large databases to discover the identity of the user, which would be unrealistic or impossible to perform on a classical computer. The system can determine that the quantum optimizer will be able to perform this search in real-time or near real-time. In this example, data from the pressure plate may be used to verify the authentication once the quantum optimizer has authenticated the user based on the facial recognition data received from the three-dimensional camera. It should be understood that the above example is offered only for purposes of explanation. In some embodiments, the system may determine that all of the data received from authentication devices should be optimized. In other embodiments, the system may determine that only some data received needs to be optimized.

At step 203, the classical computer then formats the subset of data it has determined should be optimized. As noted above, the quantum optimizer is designed to solve optimization problems in real-time or near real-time. An optimization problem as used herein refers to a problem of finding the best solution of a set of all known solutions. Thus, formatting the data sent to the quantum optimizer involves organizing the data such that the quantum optimizer can recognize the data as an optimization problem.

With regard to step 204, the classical computer transmits the formatted subset of data to the quantum optimizer. Transmission may be any suitable method for communicating data to the data extraction subsystem 104. For example, the classical computer and the quantum optimizer may be connected by a wired transmission line, if they are in close proximity to one another. In other embodiments, the quantum optimizer and/or the classical computer may be off-site, and some method of wireless communication may be preferred.

At step 205, the quantum optimizer runs the formatted data it has received from the classical computer to obtain the optimized result. As noted, the quantum optimizer is configured to solve optimization problems. Thus, the quantum optimizer may obtain an optimized result through quantum annealing or adiabatic expansion, or by executing a suitable quantum optimization algorithm.

After the optimized result has been obtained, the quantum optimizer then transmits the result back to the classical computer at step 206. In some embodiments, transmission back to the classical computer may be over the same transmission line as was used to send the formatted data to the quantum optimizer. In other embodiments, a different transmission line may be used to transmit the optimized result back to the classical computer.

Finally, at step 207, the classical computer may perform actions based on the optimized result. In some embodiments, the classical computer may receive an authentication of a user from the classical computer. The classical computer may then verify the authentication at step 207. In other embodiments, the classical computer may further be configured to customize a user interface at a channel upon verification of the user. In yet other embodiments, the classical computer may approve a transaction based on verifying the user.

Figure 3:
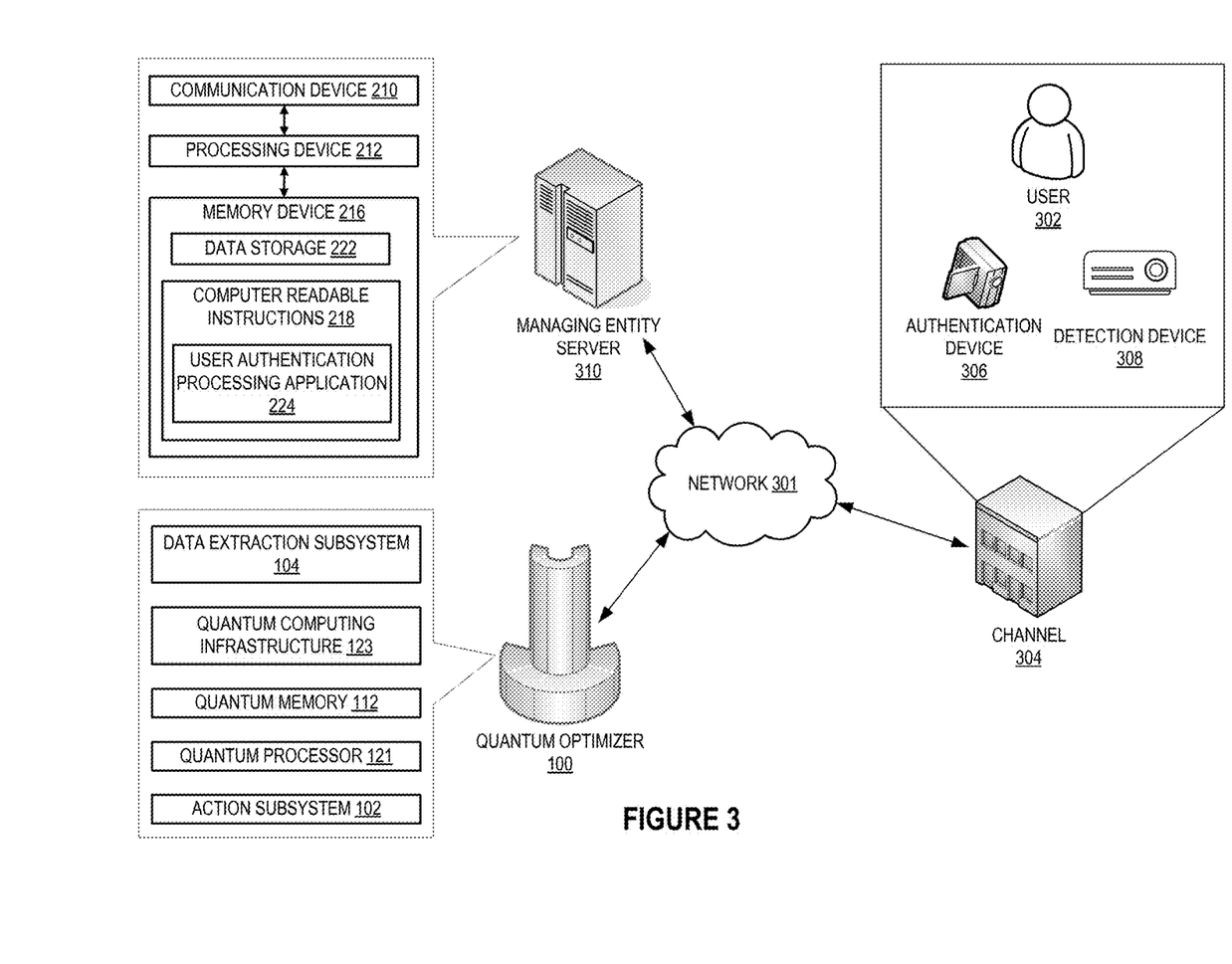
FIG. 3 provides a block diagram illustrating a system environment for providing a real-time multi-faceted authentication at a channel, in accordance with an embodiment of the invention.

FIG. 3 is an exemplary environment in which embodiments of the present invention may be implemented. As depicted in FIG. 3, a user 302 enters a channel 304. In some embodiments, the channel is a physical structure associated with a financial institution. For example, the channel may be an Automated Teller Machine (ATM), a brick-and-mortar branch of the financial institution, or the like. In other embodiments, the channel may not require a physical presence. In such embodiments, the channel may be a website, a mobile device application, or any channel that can be accessed remotely. For simplicity, FIG. 3 shows a user entering a physical building, but should be understood as encompassing remote access channels as well as other types of physical structures, such as ATMs.

Also shown at the channel are one or more authentication devices 306 and one or more detection devices 308 operatively connected to the system such that they are able to communicate with one or more managing entity servers 310 over a network 301. Though FIG. 3 depicts the channel devices 306 and 308 and the managing entity server 310 as located separately, it should be understood that the managing entity servers 310 may be located anywhere, so long as they are able to communicate with the authentication devices 306 and detection devices 308. In some embodiments, the financial institution server may be located in the channel, while in other embodiments, the financial institution server may be located in a central location and in communication with the channel devices over a network 301. Further, the financial institution server contains a communication device 210, a processing device 212, a memory device 216, data storage 222, and computer readable instructions 218. The computer readable instructions 218 may comprise a financial institution application 224.

The communication device 210 allows the managing entity server 310 to communicate with the channel devices 306 and 308, as well as with the quantum optimizer 100. It should be understood that the communication device 210 may be one or more communication devices so that the financial institution can communicate over different channels with different devices. For example, the financial institution server may communicate over the network 301 via the Internet with the channel devices 306 and 308, while it may communicate via hardwired connection to the quantum optimizer 100.

When the user 302 enters the channel 304, a detection device 308 detects the presence of the user. Detection devices may be any device that is capable of detecting the presence of a user in a channel. Examples of detection devices may include, but are not limited to, cameras, motion sensors, heat sensors, pressure plates, microphones, or the like. In embodiments of the invention involving remote access channels (such as mobile applications or websites), the detection device may be embodied in software code or modules capable of detecting that a user has attempted to gain access to the remote channel.

Once the detection device 308 has detected the presence of a user, the system queries one or more authentication devices 306 to authenticate the user. As mentioned previously, authentication devices may be three-dimensional cameras, pressure plates, radio frequency identification (RFID) scanners, microphones, retina scanners, and the like. In some embodiments, one or more authentication devices may also serve as a detection device. In other embodiments, the one or more authentication devices are wholly separate from the detection device. In yet other embodiments where the channel is accessible remotely—e.g. a website or mobile application—the authentication device may be embodied by software code or modules that gather metadata on the user's remote actions. In that regard, the authentication device is capable of monitoring the behavior of the remote user much in the same way physical authentication devices monitor the user's behavior in a physical channel.

Once queried, the authentication devices 306 capture multi-faceted data on the user entering the channel. For example, a three-dimensional camera will take photographs of the user's face to create a three-dimensional image of the user's face. Later, this information will be compared to known facial recognition data to find a match for the user. Similarly, a pressure plate might measure a user's weight as they enter into the channel, a RFID scanner may scan the RF spectrum to identify a user's credit card or cell phone, and a microphone may capture the user's voice. When the channel is a remote channel, such as a website or mobile application, the authentication devices may be software code or modules configured to gather data on the user's remote behavior. For example, the authentication device may be a java applet that collects data on the user's keystrokes while accessing the remote channel. No matter the form of information collected from the authentication devices, the system is configured to receive data from each device to perform a multifaceted authentication process.

Once all of the authentication data has been received from the queried authentication devices 306, the system then determines what authentication data is suitable for optimization. Not all data received from the authentication devices will necessarily be suitable for optimization. Operation of the quantum computer uses costly resources, so it may be desirable to minimize the amount of data sent to the quantum optimizer. In this regard, the system may determine that data from one or more of the authentication devices may be sufficient to authenticate the user with a high degree of confidence. In an exemplary embodiment, the system will comprise multiple authentication devices, with at least one authentication device comprising a three-dimensional camera. In general, a high quality three-dimensional image of a user's face will provide a high degree of confidence that the system will be able to authenticate the user. The quantum optimizer will likely be able to authenticate the user based on just receiving high quality image data from a three-dimensional camera. However, if the three-dimensional camera is unable to obtain a high quality image—because of an obstruction, for example—the quantum optimizer may not be able to authenticate the user based just on the image data. In this instance, the system will determine that additional authentication data needs to be sent to the quantum optimizer in order to obtain an authentication of the user.

Determining which authentication data is suitable for optimization may further comprise assigning an authentication reliability score to the authentication data, wherein the score is numerical representation of the authentication data's likelihood of producing an authentication. In some embodiments, the authentication reliability score must be above a certain predetermined threshold to be sent to the quantum optimizer. If the authentication reliability score is less than the predetermined threshold, the system will determine that additional authentication data will need to be sent to the quantum optimizer. In this regard, the system is able to ensure a high degree of accuracy while minimizing the quantum optimizer's resource consumption.

Figure 4:
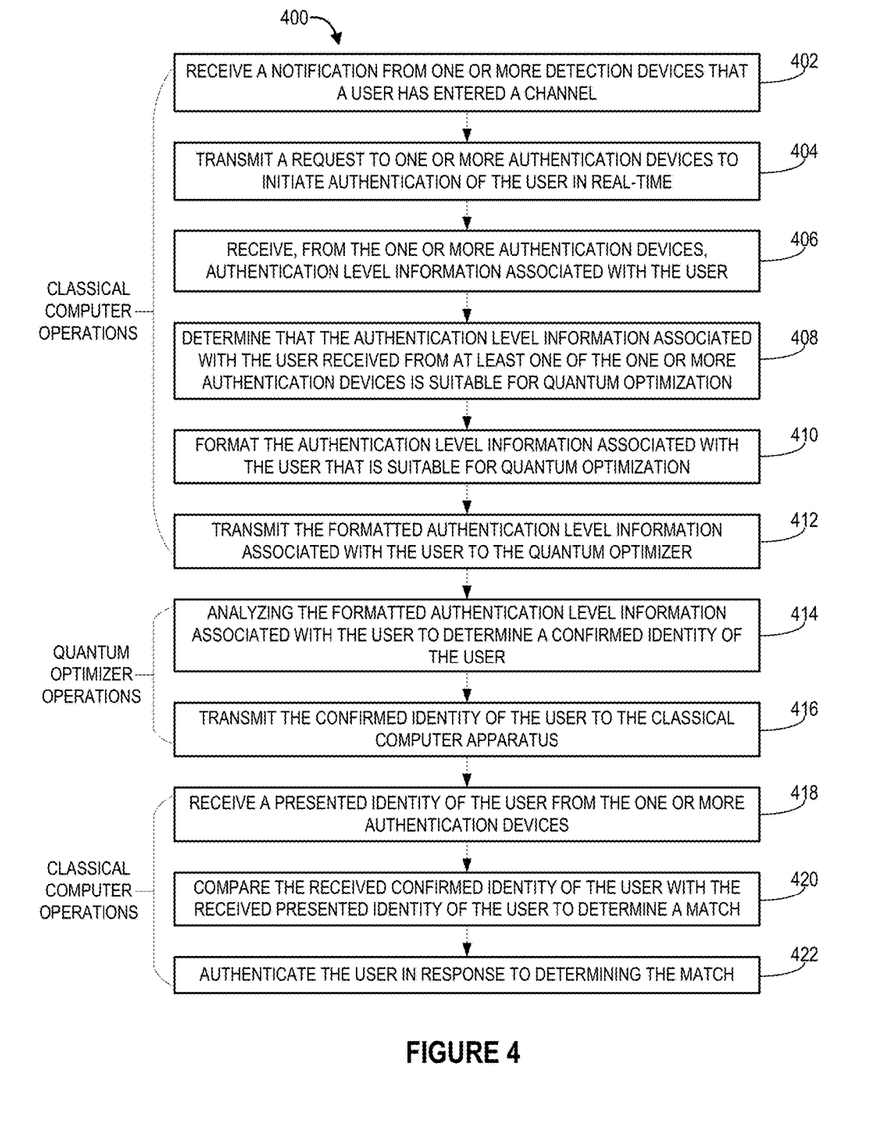
FIG. 4 provides a flowchart illustrating a process for providing a real-time multi-faceted authentication at a channel, in accordance with an embodiment of the invention.

Referring now to FIG. 4, a flowchart is provided to illustrate one embodiment of a process 400 for providing real-time multi-faceted authentication at a channel, in accordance with embodiments of the invention. The real-time nature of acquiring and processing the authentication level information data is vital to the managing entity's ability to identify or otherwise authenticate a user either immediately or within a short enough period of time for the user to still be interacting with the channel. For example, the system must be able to authenticate the user before the user is able to execute a transaction, place a deposit, withdraw funds, open an account, and the like. When a classical computer apparatus is unable to perform these tasks substantially in real-time, then the invention disclosed herein is especially beneficial to utilize the quantum optimizer to perform the resource-intensive processing of the authentication data to allow the system to identify or otherwise authenticate the user in real-time, or at least within a time period that the user is interacting with the channel.

In some embodiments, the process 400 may include block 402, where the classical computer of the system receives a notification from one or more detection devices that a user has entered a channel.

As used herein, the term "channel" refers to a building, device, physical location, or other structure that is configured to allow a user to communicate with the managing entity's system. For example, the channel may be an automated teller machine (ATM) owned or otherwise operated by the managing entity such that the ATM may display information, notices, and requests to the user, and receive inputs or commands from the user. In another example, the channel may comprise at least a portion of a financial institution center (e.g., a banking center). In such embodiments, the financial institution center may contain or otherwise comprise one or more user communication devices, ATMs, point of sale (POS) terminals, kiosks, and the like that are configured to interact with the user. The channel may also comprise a computer terminal connected over the Internet to servers of the managing entity (e.g., a financial institution). In such embodiments, the computer terminal may comprise a user interface configured to display and/or receive information from the user. The computer terminal may be physically located in any location, and does not necessarily need to be positioned in a location associated with the managing entity. In fact, the computer terminal may comprise a known mobile computing device (e.g., a mobile telephone, a tablet computer, a laptop computer, and the like).

The detection devices may be one or more devices configured to sense or otherwise detect the presence of a user within and/or near the channel. Individual detection devices may include, but are not limited to, a motion sensor, a scale or other weight sensor, a camera (including infrared cameras), a microphone, an infrared trip beam, a door opening sensor, an accelerometer, and the like. Of course, one or more detection devices may be used in the system to detect the presence of a user.

The detection devices may be a component of, or be operatively coupled with, the channel itself. For example, a motion detector and/or a camera may be attached to an ATM and configured to detect the presence of a user approaching and/or using the ATM. Similarly, a camera of a mobile device may comprise the detection device of said mobile device. Additionally or alternatively, one or more detection devices may be positioned near or otherwise apart from the channel itself. For example, a motion detector or a camera may be positioned on a wall next to an ATM, a weight sensor may be positioned in front of a computer terminal, and the like.

Once a detection device determines that the user is present, the detection device may automatically transmit an alert of the user's presence (i.e., a detection alert) to the channel and/or the managing entity system. Therefore, each detection device may be communicably connected to the channel and/or the managing entity system through a hard wire, a wireless network, a near field connection, a telephonic connection, and the like.

In some embodiments, the process 400 includes block 404, where the classical computer of the system transmits a request to one or more authentication devices to initiate authentication of the user in real-time. In some embodiments, the system executes block 404 automatically in direct response to receiving the notification from the one or more detection devices. This transmitted request to the authentication devices may be in direct response to receiving the detection alert from the one or more detection devices. As with the detection devices, the one or more authentication devices may be a component of, operatively attached to, or positioned adjacent to the channel. In this way, the authentication devices are configured to acquire authentication level information about the user as the user enters into, engages with, or otherwise interacts with the channel.

An individual authentication device may comprise, but is not limited to, any of the following devices: a camera, an infrared camera, a three-dimensional camera, a pressure plate or other scale, a microphone, a radio frequency identification chip, a POS terminal, a chemical sensor (e.g., a sensor that measures chemical components of the air), a biometric scanner (e.g., a fingerprint scanner, a hand print scanner, a retinal scanner, a facial recognition scanner, a DNA scanner, an speech analyzer, a three dimensional body structure analyzer, and the like). In some embodiments of the system, one or more the authentication devices is capable of acquiring an extremely large amount of authentication level information data. For example, a three-dimensional facial recognition scanner may acquire multiple data elements for each voxel of acquired data: distance data, orientation data, color data, infrared or relative temperature data, time data, and the like. While the example authentication devices described above may be particularly useful in acquiring data that will help the system to authenticate a user, any device configured to acquire any amount of data associated with a user's identity may be utilized by the system.

By acquiring authentication data from one or more authentication devices and/or from an input by the user (i.e., a presented identity), the system is able to analyze the identity of the user in a multi-faceted manner that is capable of identifying, comparing and/or otherwise confirming an identity of a user that is interacting with the channel.

All or parts of the acquired authentication level information data can subsequently be aggregated to reconstruct or otherwise generate a facial structure that is capable of being analyzed for facial recognition purposes. However, due to the extremely large amount of data that must be aggregated and/or analyzed, and due to the complex nature of a three-dimensional facial recognition analysis algorithms, a conventional or classical computer apparatus would not be able to perform the analysis in real-time or in substantially real-time.

The authentication devices may receive command signals or other instructions from the channel and/or the managing entity system to initiate and/or end the acquisition of the authentication level information. For example, a camera may receive a command from the channel to begin recording the user for a predetermined period of time.

Additionally, in some embodiments, the process 400 includes block 406, where the classical computer of the system receives, from the one or more authentication devices, authentication level information associated with the user. The authentication devices may automatically transmit the acquired authentication level information data as the data is acquired and/or at an end of the authentication device's acquisition. Additionally or alternatively, the authentication devices may receive a command signal or other instructions from the channel or managing entity system to transmit the authentication level data back to the channel or managing entity system. In some embodiments, the one or more authentication devices may encrypt, zip, password protect, or otherwise secure and/or compress the authentication level information data before transmitting the data to the channel or the managing entity system. As a side note, the managing entity system may comprise a portion of or the entirety of the channel, so any actions performed by the channel can be considered actions performed by the managing entity system.

Encrypting the acquired authentication level data can be beneficial to protecting user information as it is transmitted between the devices and servers of the system. Additionally, compressing the acquired authentication level data can be beneficial to transmitting large amounts of data in a more efficient manner (e.g., requiring less time and/or resources to transmit the data). Of course, encrypting and/or compressing data will increase the workload of a subsequent processor that must decrypt and/or decompress the data before analyzing the data. Therefore, the authentication level data received by the system may be prohibitively difficult to extract and analyze in real-time due to any or all of the following factors: the amount of data received, the security or other encryption techniques used to protect the data transmissions, and the compression techniques used to more easily facilitate the data transmissions and/or storage.

The process 400 may also include block 408, where the classical computer of the system determines that the authentication level information associated with the user received from at least one of the one or more authentication devices is suitable for quantum optimization. As described above, several factors may allow a classical computing apparatus to determine that its classical computer operations are not sufficiently equipped to analyze at least a portion of the authentication level information data in a time period that is short enough to complete authentication of the user either before the user has initiated an interaction with the channel or while the user is still interacting with the channel.

In some embodiments, the classical computing apparatus may be able to perform some of the more simple tasks (e.g., matching a received PIN to a known PIN of the user, matching a received username and/or password of the user to a known username and/or password stored in an associated database, and the like). In such cases, the classical computing apparatus may go ahead and analyze this "simple" portion of the authentication level information data using its own classical computer operations. However, the classical computing apparatus of the system may also identify a complex portion of the authentication level information data that would require more processing time and/or requirements than the classical computing apparatus is equipped to handle to analyze the data in real time or at least within an expected time that the user is interacting with the channel. In such embodiments, the system may tag or otherwise denote this "complex" portion of the authentication level information data as being suitable for quantum optimization. In this way, the system may make a determination that processing the authentication level information by the classical computer apparatus alone is not feasible, and therefore determines that the authentication level information is suitable for quantum optimization.

The system may perform one or more "quantum optimizer suitability tests" to make these determinations for at least portions of the received authentication level information data, where the quantum optimizer suitability test is performed as the authentication level information is received from the authentication devices and before the system begins analyzing the authentication level information data by conventional means-alone.

Additionally or alternatively, the system may be configured to detect a data type of the received authentication data, where one or more known data types are associated with data that is suitable for quantum optimization. In such embodiments, the system may automatically label the received authentication level information of one of these particular data types as being suitable for quantum optimization upon receiving the data. For example, because three-dimensional facial recognition data is inherently data intensive, the system may determine that any data received from a three-dimensional facial recognition authentication device will automatically be labeled as suitable for quantum optimization. Likewise, the system may determine that any data with a certain format, structure, file name extension, and the like, may be inherently or at least likely to be suitable for quantum optimization. As such, the system may automatically label, tag, or otherwise denote the received authentication level information data of the certain format, structure, and/or file name extension as suitable for quantum optimization.

In some embodiments, the process 400 includes block 410, where the classical computer of the system formats the authentication level information associated with the user that is suitable for quantum optimization. In this way, the classical computer of the system transforms the authentication level data into a format that the quantum optimizer can receive and analyze. Additionally, in some embodiments, the process 400 includes block 412, where the classical computer of the system transmits the formatted authentication level information associated with the user to the quantum optimizer. In some embodiments, the quantum optimizer is a component of the channel or is operatively coupled to the channel, such that the formatted authentication level information is transmitted via a wireline. In other embodiments, the classical computer of the system transmits the formatted authentication level information to the quantum optimizer over a wireless network.

The process 400 may include block 414, where the quantum optimizer of the system analyzes the formatted authentication level information associated with the user to determine a confirmed identity of the user. As described above, the received formatted authentication level information data may require complex algorithms to analyze, or may be highly resource intensive (e.g., prohibitively high, so as to require more processing time via a conventional computer apparatus than the user is expected to interact with the channel). Therefore, the quantum optimizer may be specially configured to automatically perform the complex algorithms or resource intensive analysis required to analyze the authentication level information data in real-time or substantially in real-time. As such, the quantum optimizer may be a specialized quantum computing device that is specifically designed to receive the formatted authentication level information data as input, perform the appropriate analysis of the formatted authentication level information data, and publish or otherwise transmit a result of the analysis.

Furthermore, the process 400 may include block 416, where the quantum optimizer of the system transmits the confirmed identity of the user to the classical computer apparatus. In some embodiments, the quantum optimizer may automatically transmit its results once the analysis is completed. In other embodiments, the quantum optimizer may be performing a simulation or other probability-based analysis that includes a standard deviation and/or a confidence metric. Once the quantum optimizer determines that the result of the analysis meets the confidence metric (or is otherwise within a certain degree of level of confidence to confirm an identity of the user), the quantum optimizer of the system may then automatically transmit the results (i.e., the confirmed identity or at least a confirmed authentication level information value) to the classical computer apparatus of the system.

The results may be a user identity that the quantum optimizer determined is within a certain degree of certainty (e.g., the quantum optimizer is within a predetermined threshold percentage of confidence that the user interacting with the channel is the "confirmed identity"). In other embodiments, the confirmed identity may not be an actual identity of a user, but rather be an indication that the user interacting with the channel is approved to be interacting with the channel. For example, the quantum optimizer may determine that the user is a client of the managing entity without ever determining the actual identity of the user. In other embodiments, the quantum optimizer may determine that the user is associated with a group or organization that is authorized to interact with the channel, without identifying the actual identity of the user. Of course, in some embodiments, the system does determine the actual identity as the confirmed identity, and this identity may be transmitted to the classical computer apparatus of the system. The confirmed identity that is transmitted can be, but is not limited to, the following information: a notification that the identity of the user is the same as the user's presented identity, a name of the user, an account number of the user, a financial token representation of the user, a username of the user, a user identification number, and the like.

In some embodiments, the process 400 may continue to block 418, where the classical computer of the system receives a presented identity of the user from the one or more authentication devices. As used herein, the term "presented identity" refers to any information actively provided by the user as a representation of who the user is or who the user is associated with. For example, the presented identity may be a debit or credit card number acquired by a card reader at the channel, a name or username input by the user at a user interface of the channel, a vocal representation of the user's name received by a microphone of the channel, a personal identification number (PIN), any combination of the above, and the like. These examples are meant to be non-limiting, as the user may present the user's identity to the system in a multitude of ways.

The classical computer apparatus of the system may then match the received presented identity to other known user information associated with the user. For example, if the system receives a card number as the presented identity, the system may determine that the presented identity is associated with a financial account of the managing entity, and that the financial account is in turn associated with a name of the user, an address of the user, contact information of the user, additional accounts of the user, biometric information of the user (including, but not limited to, fingerprint scan samples, three-dimensional facial recognition topographies or maps, voice samples, retinal scan samples, hand scan samples, weight samples, and the like) and the like. The client information and/or the presented identity information may be stored in a database that is either local to the channel or is reachable and easily searchable by the system through a communication network. In some embodiments, this information associated with the presented identity of the user is transmitted to the quantum optimizer along with or as part of the formatted authentication level information data.

Additionally, the process 400 may include block 420, where the classical computer of the system compares the received confirmed identity of the user with the received presented identity of the user to determine a match. The system may search the database that stores the client information associated with the presented identity to determine whether the received confirmed identity does indeed match either the presented identity and/or any of the identity information of the client related to the presented identity. For example, in embodiments where the system receives a confirmed identity of a three-dimensional facial recognition input, the system may match the associated three-dimensional facial recognition information with a stored three-dimensional facial recognition sample to determine whether they match.

In embodiments where the confirmed identity of the user is a confirmation that the presented identity matches the authentication level information acquired by the authentication devices, the system may not compare the confirmed identity, but instead records a confirmation that the authentication level information is within the certain level of confidence to indicate that the user interacting with the channel is in fact the same as the presented identity.

Finally, the process 400 may include block 422, where the classical computer of the system authenticates the user in response to determining the match. This authentication may allow the user to perform certain actions with or through the channel. For example, the user may now be authorized to perform a transaction with accounts associated with the presented identity. By utilizing the quantum optimizer to perform resource-intensive computations, the system will have authenticated a user's presented identity with a much higher degree of confidence than through using authentication metrics that only require computational resources that can be done in real-time by a classical computer apparatus.

Furthermore, in embodiments where the system has identified the actual identity of the user, the system may then present the user with a personalized display at the channel. This personalized display may include frequently used options (e.g., quick withdrawals based on the most common withdrawal amounts of the user in the user's withdrawal history, suggested transactions based on the user's transaction history, coupons or other rewards that are based on the user's identity, and the like), and other display preferences of the user.

As will be appreciated by one of skill in the art, the present invention may be embodied as a method (including, for example, a computer-implemented process, a business process, and/or any other process), apparatus (including, for example, a system, machine, device, computer program product, and/or the like), or a combination of the foregoing. Accordingly, embodiments of the present invention may take the form of an entirely hardware embodiment, an entirely software embodiment (including firmware, resident software, micro-code, and the like), or an embodiment combining software and hardware aspects that may generally be referred to herein as a "system." Furthermore, embodiments of the present invention may take the form of a computer program product on a computer-readable medium having computer-executable program code embodied in the medium.

Any suitable transitory or non-transitory computer readable medium may be utilized to perform the tasks of the classical computer apparatus. The computer readable medium may be, for example but not limited to, an electronic, magnetic, optical, electromagnetic, infrared, or semiconductor system, apparatus, or device. More specific examples of the computer readable medium include, but are not limited to, the following: an electrical connection having one or more wires; a tangible storage medium such as a portable computer diskette, a hard disk, a random access memory (RAM), a read-only memory (ROM), an erasable programmable read-only memory (EPROM or Flash memory), a compact disc read-only memory (CD-ROM), or other optical or magnetic storage device.

In the context of this document, a computer readable medium may be any medium that can contain, store, communicate, or transport the program for use by or in connection with the instruction execution system, apparatus, or device. The computer usable program code may be transmitted using any appropriate medium, including but not limited to the Internet, wireline, optical fiber cable, radio frequency (RF) signals, or other mediums.

Computer-executable program code for carrying out operations of embodiments of the present invention may be written in an object oriented, scripted or unscripted programming language such as Java, Perl, Smalltalk, C++, or the like. However, the computer program code for carrying out operations of embodiments of the present invention may also be written in conventional procedural programming languages, such as the "C" programming language or similar programming languages.

Embodiments of the present invention are described above with reference to flowchart illustrations and/or block diagrams of methods, apparatus (systems), and computer program products. It will be understood that each block of the flowchart illustrations and/or block diagrams, and/or combinations of blocks in the flowchart illustrations and/or block diagrams, can be implemented by computer-executable program code portions. These computer-executable program code portions may be provided to a processor of a general purpose computer, special purpose computer, or other programmable data processing apparatus to produce a particular machine, such that the code portions, which execute via the processor of the computer or other programmable data processing apparatus, create mechanisms for implementing the functions/acts specified in the flowchart and/or block diagram block or blocks.

These computer-executable program code portions may also be stored in a computer-readable memory that can direct a computer or other programmable data processing apparatus to function in a particular manner, such that the code portions stored in the computer readable memory produce an article of manufacture including instruction mechanisms which implement the function/act specified in the flowchart and/or block diagram block(s).

The computer-executable program code may also be loaded onto a computer or other programmable data processing apparatus to cause a series of operational steps to be performed on the computer or other programmable apparatus to produce a computer-implemented process such that the code portions which execute on the computer or other programmable apparatus provide steps for implementing the functions/acts specified in the flowchart and/or block diagram block(s). Alternatively, computer program implemented steps or acts may be combined with operator or human implemented steps or acts in order to carry out an embodiment of the invention.

As the phrase is used herein, a processor may be "configured to" perform a certain function in a variety of ways, including, for example, by having one or more general-purpose circuits perform the function by executing particular computer-executable program code embodied in computer-readable medium, and/or by having one or more application-specific circuits perform the function.

Embodiments of the present invention are described above with reference to flowcharts and/or block diagrams. It will be understood that steps of the processes described herein may be performed in orders different than those illustrated in the flowcharts. In other words, the processes represented by the blocks of a flowchart may, in some embodiments, be in performed in an order other that the order illustrated, may be combined or divided, or may be performed simultaneously. It will also be understood that the blocks of the block diagrams illustrated, in some embodiments, merely conceptual delineations between systems and one or more of the systems illustrated by a block in the block diagrams may be combined or share hardware and/or software with another one or more of the systems illustrated by a block in the block diagrams. Likewise, a device, system, apparatus, and/or the like may be made up of one or more devices, systems, apparatuses, and/or the like. For example, where a processor is illustrated or described herein, the processor may be made up of a plurality of microprocessors or other processing devices which may or may not be coupled to one another. Likewise, where a memory is illustrated or described herein, the memory may be made up of a plurality of memory devices which may or may not be coupled to one another.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

What is claimed is:

1. A system for providing real-time multi-faceted authentication at a channel, the system comprising:
   a classical computer apparatus comprising:
      a processor;
      a memory; and
      a user authentication processing application that is stored in the memory and executable by the processor;
   a quantum optimizer in operative communication with the classical computer apparatus, the quantum optimizer comprising:
      a quantum processor; and
      a quantum memory;
   wherein the user authentication processing application is configured to:
      receive a notification from one or more detection devices that a user has entered a channel;
      transmit, in response to receiving the notification from the one or more detection devices, a request to one or more authentication devices to initiate authentication of the user in real-time;
      receive, from the one or more authentication devices, authentication level information associated with the user;
      determine a subset of authentication level information associated with the user received from at least one of the one or more authentication devices that requires quantum optimization, wherein the subset of authentication level information comprises data that cannot be efficiently processed by the classical computer apparatus based on complexity and/or quantity;
      format the subset of authentication level information for quantum optimization;
      transmit the formatted subset of authentication level information associated with the user to the quantum optimizer;
      receive, from the quantum optimizer, a notification of a confirmed identity of the user;
      receive, from the one or more authentication devices, a presented identity of the user;
      compare the received confirmed identity of the user with the received presented identity of the user to determine a match; and
      authenticate the user in response to determining the match;
   wherein the quantum optimizer is configured to:
      receive the formatted subset of authentication level information associated with the user from the classical computer apparatus;
      analyze the formatted authentication level information associated with the user to determine the confirmed identity of the user; and
      transmit the confirmed identity of the user to the classical computer apparatus.

2. The system of claim 1, wherein the system is further configured to, in response to authenticating the user, present the user with a personalized display at the channel.

3. The system of claim 1, wherein determining that the subset of authentication level information that is suitable for quantum optimization further comprises a determination that processing the authentication level information by the classical computer apparatus alone is not feasible.

4. The system of claim 1, wherein the one or more authentication devices comprises at least one of a three-dimensional camera, a pressure plate, a microphone, and a radio frequency identification chip.

5. The system of claim 4, wherein the one or more authentication devices comprises the three-dimensional camera and the authentication level information comprises at least a three-dimensional facial recognition map of the user.

6. The system of claim 1, wherein the presented user identity comprises a personal identification number (PIN), wherein verification of the user further comprises confirming that the presented user identity matches a known PIN for that user.

7. The system of claim 1, wherein the channel comprises one of an automated teller machine (ATM), a financial institution banking center, or a computer terminal connected over Internet to financial institution servers.

8. A method for providing real-time multi-faceted authentication at a channel, the method comprising:
   receiving, via a classical computer apparatus, a notification from one or more detection devices that a user has entered a channel;
   transmitting, in response to receiving the notification from the one or more detection devices, via the classical computer apparatus, a request to one or more authentication devices to initiate authentication of the user in real-time;
   receiving, from the one or more authentication devices via the classical computer apparatus, authentication level information associated with the user;

determining, via the classical computer apparatus, a subset of authentication level information associated with the user received from at least one of the one or more authentication devices that requires quantum optimization, wherein the subset of authentication level information comprises data that cannot be efficiently processed by the classical computer apparatus based on complexity and/or quantity;

formatting, via the classical computer apparatus, the subset of authentication level information for quantum optimization;

transmitting the formatted subset of authentication level information associated with the user to the quantum optimizer;

receiving, via the quantum optimizer, the formatted authentication level information associated with the user from the classical computer apparatus;

analyzing, via the quantum optimizer, the formatted subset of authentication level information associated with the user to determine a confirmed identity of the user;

transmitting, from the quantum optimizer, the confirmed identity of the user to the classical computer apparatus;

receiving, via the classical computer apparatus, from the quantum optimizer, a notification of a confirmed identity of the user;

receiving, via the classical computer apparatus, from the one or more authentication devices, a presented identity of the user;

comparing, via the classical computer apparatus, the received confirmed identity of the user with the received presented identity of the user to determine a match; and authenticating, via the classical computer apparatus, the user in response to determining the match.

9. The method of claim 8, wherein the method further comprises, in response to authenticating the user, presenting the user with a personalized display at the channel via the classical computer apparatus.

10. The method of claim 8, wherein determining that the subset of authentication level information that is suitable for quantum optimization further comprises a determination that processing the authentication level information by the classical computer apparatus alone is not feasible.

11. The method of claim 8, wherein the one or more authentication devices comprises at least one of a three-dimensional camera, a pressure plate, a microphone, and a radio frequency identification chip.

12. The method of claim 11, wherein the one or more authentication devices comprises the three-dimensional camera and the authentication level information comprises at least a three-dimensional facial recognition map of the user.

13. The system of claim 8, wherein the presented user identity comprises a personal identification number (PIN), wherein verifying the user further comprises confirming that the presented user identity matches a known PIN for the user.

14. The system of claim 8, wherein the channel comprises one of an automated teller machine (ATM), a financial institution banking center, or a computer terminal connected over Internet to financial institution servers.

15. A computer program product for providing real-time multi-faceted authentication at a channel, the computer program product comprising a non-transitory computer-readable medium comprising code causing an apparatus to:

receive a notification from one or more detection devices that a user has entered a channel;

transmit, in response to receiving the notification from the one or more detection devices, a request to one or more authentication devices to initiate authentication of the user in real-time;

receive, from the one or more authentication devices, authentication level information associated with the user;

determine a subset of authentication level information associated with the user received from at least one of the one or more authentication devices that requires quantum optimization, wherein the subset of authentication level information comprises data that cannot be efficiently processed by the classical computer apparatus based on complexity and/or quantity;

format the subset of authentication level information for quantum optimization;

transmit the formatted authentication level information associated with the user to the quantum optimizer;

receive, from the quantum optimizer, a notification of a confirmed identity of the user;

receive, from the one or more authentication devices, a presented identity of the user;

compare the received confirmed identity of the user with the received presented identity of the user to determine a match; and authenticate the user in response to determining the match;

wherein the quantum optimizer is configured to:
    receive the formatted subset of authentication level information associated with the user from the classical computer apparatus;
    analyze the formatted authentication level information associated with the user to determine the confirmed identity of the user; and
    transmit, to the classical computer apparatus, the confirmed identity of the user.

16. The computer program product of claim 15, wherein the computer program product is further configured to, in response to authenticating the user, present the user with a personalized display at the channel.

17. The computer program product of claim 15, wherein determining that the subset of authentication level information that is suitable for quantum optimization further comprises a determination that processing the authentication level information by the classical computer apparatus alone is not feasible.

18. The computer program product of claim 15, wherein the one or more authentication devices comprises at least one of a three-dimensional camera, a pressure plate, a microphone, and a radio frequency identification chip.

19. The computer program product of claim 18, wherein the one or more authentication devices comprises the three-dimensional camera and the authentication level information comprises at least a three-dimensional facial recognition map of the user.

20. The computer program product of claim 15, wherein the channel comprises one of an automated teller machine (ATM), a financial institution banking center, or a computer terminal connected over Internet to financial institution servers.

* * * * *